Figure 3:
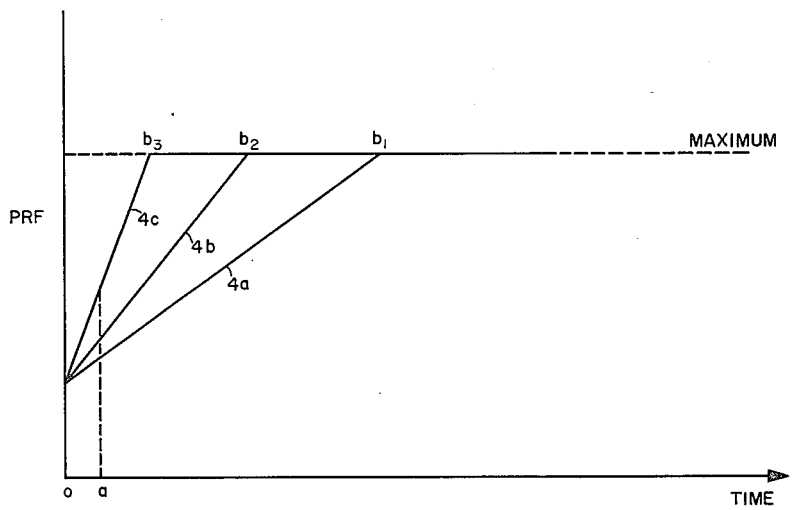

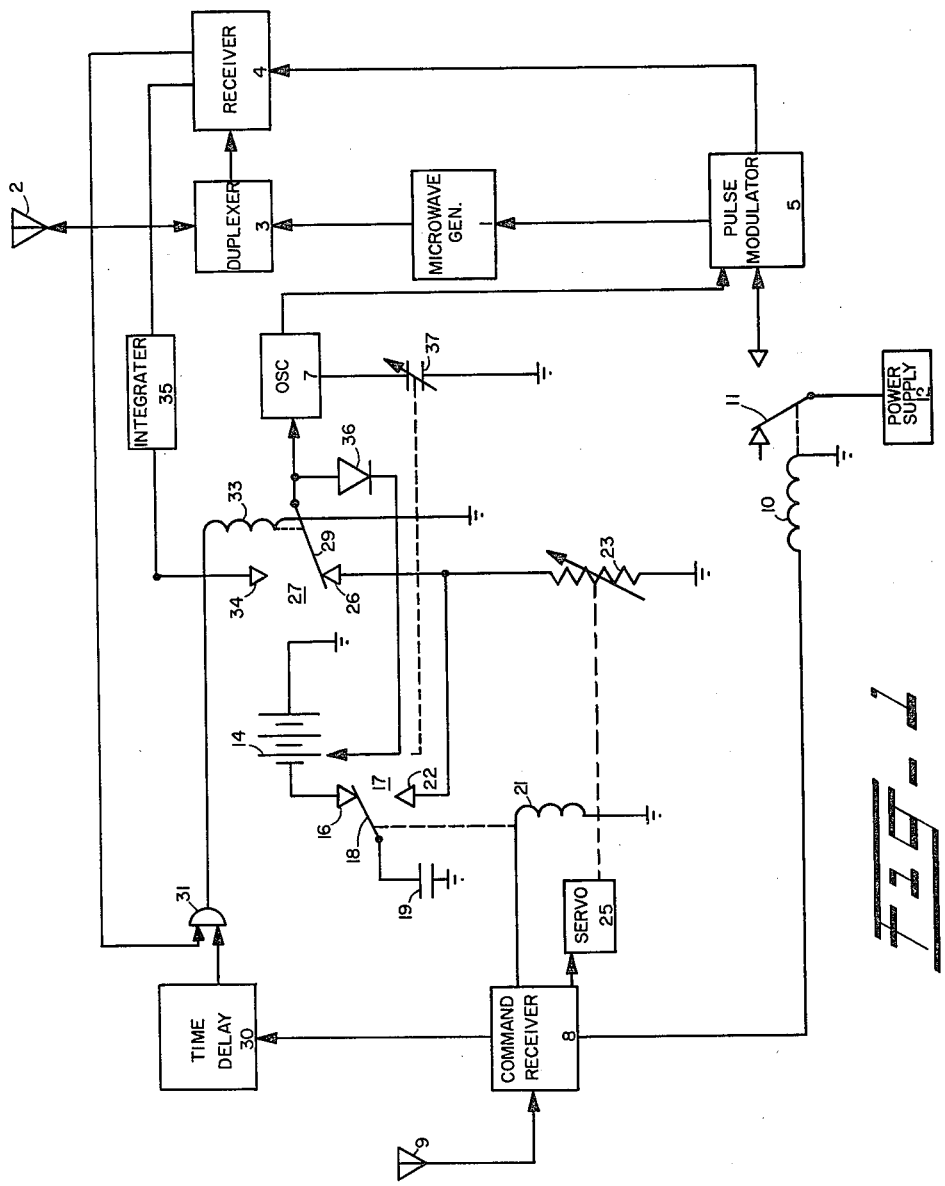

INVENTOR.
MICHAEL W. McKAY
BY
ATTORNEY.

United States Patent Office 3,077,596
Patented Feb. 12, 1963

3,077,596
RADAR TRANSMITTING SYSTEM
Michael W. McKay, Tarrytown, N.Y., assignor to General Precision, Inc., a corporation of Delaware
Filed Apr. 11, 1960, Ser. No. 21,304
8 Claims. (Cl. 343—17.1)

This invention relates to radar transmission systems and more particularly to pulse coherent Doppler radar transmission systems suitable for use in mobile long distance detection and tracking devices.

The advent of high speed missiles and aircraft has extended to a considerable extent the distances required for tracking and zeroing in an approaching target. These increased distances have placed severe requirements on the power capabilities of the radar transmitters which supply the energy radiated for detecting and tracking incoming targets to such an extent that, where the detection and tracking device is airborne, severe range limitations result due to the added weight necessary to provide the increased power. Furthermore, the necessity for more power further reduces the range and capability of the detection bearing vehicle by consuming larger portions of the available fuel supply to generate the additional power required to detect and track at the longer distances.

Two factors are primarily responsible for the need for increased power. The first of these is the actual increased range and the resultant diminution of the power intensity at the target. This can only be overcome by increased power. The second factor is commonly referred to as blind range holes. These range holes reduce the available effective echo-power at the receiver and by eliminating the range hole losses the output power of the transmitter may be reduced by as much as 5 db or more to obtain the same echo power. This in turn results in a significant decrease in the necessary prime input power since input power may be as much as 20 times the radiated power.

One solution which would eliminate the range hole effect completely utilizes continuous wave transmission and continuous reception of the echo signal. However, such systems have proven impractical since the high sound levels and mechanical vibrations transmitted by the vehicle to the radar equipment decrease the signal to noise ratio to a point where the operation is marginal. It is therefore desirable to retain the pulse coherent Doppler system of transmission which is unaffected by the high sound levels and mechanical vibrations encountered in this type of usage.

One object of this invention is to provide a pulse coherent Doppler radar transmitting system capable of tracking targets at long distance which is light in weight and operates at low input power levels.

Another object of this invention is to provide a pulse coherent radar tracking system in which the reduction of echo power at the receiver due to the range hole effect is greatly reduced or eliminated entirely.

The invention contemplates a radar transmitter system comprising, a microwave generator, an antenna for radiating and collecting microwaves, a duplexer for connecting said generator and said receiver to the antenna, a receiver for amplifying microwave signals, means for simultaneously enabling said generator and for disabling said receiver periodically, a variable oscillator connected to said means for controlling the frequency at which said generator and said receiver are enabled and disabled, and means responsive to an external signal source for varying the frequency of said oscillator at a linear rate corresponding to the signal from the source.

The foregoing and other objects and advantages of the invention will appear more clearly from a consideration of the specification and drawings wherein one embodiment of the invention is described and shown in detail for illustration purposes only.

In the drawings:
FIGURE 1 is a block and schematic diagram of a novel radar transmitter system constructed in accordance with the invention, and,
FIGURES 2 to 4, inclusive, are graphs for illustrating the operation of the device shown in FIGURE 1.

In FIGURE 1 a microwave generator 1 is connected to an antenna 2 by a duplexer 3 which also connects antenna 2 to a receiver 4. Microwave generator 1 is operated by a pulse modulator 5 which is connected to a direct current power supply 12 which will be described more fully later and to an oscillator 7. Thus, the microwave generator 1 provides pulses of RF energy at a pulse repetition rate which is proportional to the frequency of oscillation of oscillator 7. The pulse modulator 5 also provides an output for blanking receiver 4 during the transmission period. The interconnections of antenna 2, duplexer 3, receiver 4, microwave generator 1 and pulse modulator 5 are conventional in every respect and therefore require no further explanation.

A command receiver 8 has its input connected to another antenna 9 and is arranged to receive command signals from an external source. The external source may be either a ground based or airborne surveillance radar which is equipped to search the area protected by a missile bearing the novel transmitter, and which includes a computer for determining the necessary inputs to the system. The nature of the inputs and how they are derived will be discussed in detail later.

Command receiver 8 provides four outputs each of which performs a different function. One of these outputs is applied to a solenoid 10 which closes a switch 11 and connects pulse modulator 5 to power supply 12. This output will in conjunction with the output of oscillator 7 institute operation of the device and starts the transmission of microwave energy. The initial pulse repetition rate is set in advance by circuits which will be described later.

A battery 14 has its negative terminal connected to a contact 16 of a switch 17 and the armature 18 of switch 17 is connected to one side of a grounded capacitor 19. The positive terminal of battery 14 is grounded and the condenser 19 is charged to the battery potential when armature 18 is in the position shown in the drawing which is its normal position.

The second output from receiver 8 is applied to a solenoid 21 which moves armature 18 into engagement with a contact 22 and connects the ungrounded side of capacitor 19 to one side of a grounded variable resistor 23 to complete a discharge path for the capacitor. Resistor 23 is mechanically coupled to a servo system 25 which adjusts the value of resistor 23 in accordance with the signals received by receiver 8 and applied to it by the third output of receiver 8.

The ungrounded side of variable resistor 23 is connected to a contact 26 of a switch 27 and the armature 29 of switch 27 is connected to the control input of oscillator 7. Armature 29 is shown in its normal position engaging contact 26. Thus as capacitor 19 discharges the voltage drop across resistor 23 varies which in turn varies the control voltage applied to oscillator 7 and the pulse repetition frequency of the oscillator output.

The fourth output from receiver 8 is passed through a fixed time delay circuit 30 and the output of circuit 30 is applied to one input of an "and" gate 31. The other input of "and" gate 31 is connected to the signal to noise ratio detector of receiver 4 and will when sufficient return signal has been received by the receiver 4 open the gate to pass the delayed signal from receiver 8. The output from gate 31 is applied to a solenoid 33 which urges armature 29 into engagement with a contact 34 of switch 27 and simultaneously out of engagement with contact 26. This connects the control input of oscillator 7 to the output of receiver 4 through an integrator circuit 35 which integrates the closing velocity information in the receiver. This is done because receiver 4 contains the same closing velocity information being sent by the surveillance radar. This step is not necessary and could be omitted since the value of resistor 23 may be varied continuously by the command receiver in conjunction with the signals containing the same information received from the surveillance radar and the control voltage applied this way to oscillator 7 would be the same. However, since this closing velocity information is available shortly after microwave generator 1 is turned on, it is preferable that the control be local since further radio contact is no longer necessary. Switches 11, 17 and 27 are provided with latching mechanisms not shown and once actuated by their respective solenoids will remain in that position. The outputs from receiver 8 supplied to solenoids 10 and 21 and to time delay circuit 30 are identical and were referred to as different outputs merely to facilitate the explanation of the circuit.

Another feature shown in FIGURE 1 is the circuit for limiting the maximum pulse repetition frequency of oscillator 7. Once the target and the missile have come within a pre-determined distance of each other the radiated power is sufficient notwithstanding the losses due to the range hole effect and therefore further control is no longer necessary. To this end a diode 36 has its anode connected to the control input of the oscillator and its cathode connected to an adjustable tap on battery 14. This arrangement places an upper limit on the voltage excursion of the control input and therefore limits the maximum pulse repetition frequency.

A variable capacitor 37 is also shown connected between oscillator 7 and ground. Capacitor 37 functions to limit the minimum frequency at which oscillator 7 will operate. The adjustment of both the battery tap and capacitor 37 are made manually before launching and the setting used is governed by the maximum closing velocity expected as determined by the characteristics of the missile used and the expected class of targets since in pulse coherent Doppler system the minimum PRF must be at least twice the maximum Doppler frequency shift. Both controls are ganged and adjusted simultaneously since a change in missile characteristics or the class of target would require a change in both the maximum and the minimum pulse repetition frequency.

Figure 2:
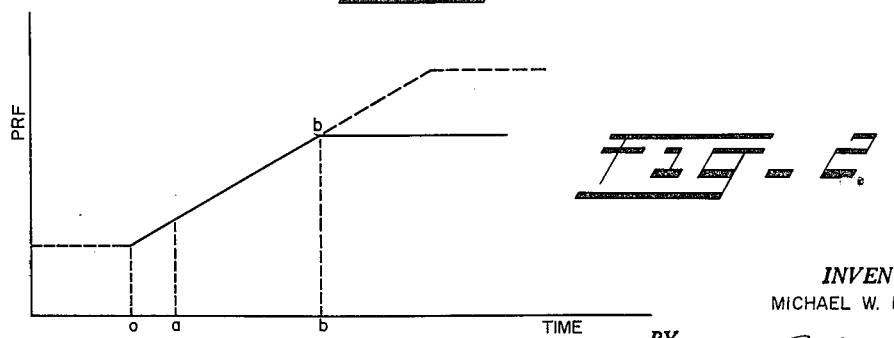

FIGURE 2 graphically illustrates how the pulse repetition frequency varies with time. The time between $t_0$ and $t_a$ is the period of delay introduced by delay circuit 30 during which the voltage across resistor 23 controls the pulse repetition frequency and the time between $t_a$ and $t_b$ is the period during which the integral of the approach velocity from circuit 35 controls the pulse repetition frequency. The pulse repetition frequency during the period of time beyond $t_b$ to intercept is controlled by diode 36 and the bias voltage applied by the tap setting on battery 14. The dashed portion of the curve indicates how the pulse repetition frequency would, if diode 36 were not present or if the biasing voltage only were changed, follow before a new cut off point is reached.

The three curves shown in FIGURE 3 are each similar to the curve shown in FIGURE 2. Curve 4a is for an approach velocity which is somewhat slower than the approach velocity of curve 4b and curve 4c is for an approach velocity somewhat faster than the approach velocity for curve 4b. In each instance however, the approach velocity is constant, therefore, the slope of each curve is constant. If at some time $t_1$ which is later than $t_0$ the approach velocity changes the slope of the curve will change. If $t_1$ is between $t_0$ and $t_a$ the change is caused by a change of resistor 23 in response to the new velocity information received by command receiver 8, and if $t_1$ occurs subsequent to $t_a$ the change in slope is in response to the change in the voltage of the input to integrator 35.

Figure 4:
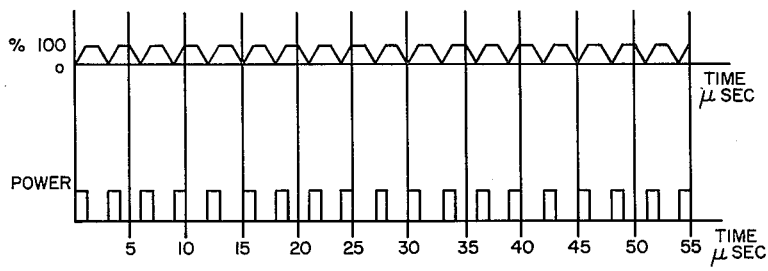

FIGURE 4 contains two graphs which illustrate the range-hole effect which the subject invention overcomes. The lower curve shows transmitted power vs. time. The duty cycle is 1/3 transmission, 2/3 reception, that is, the receiver is disabled during tranmission. The upper curve is a plot of the percentage of the received pulse available at the receiver output vs. range delay time. An examination of this graph shows at what range delay times the range hole effect is at its greatest and what range delay times the range hole effect is at its least and all the intermediate points. A range delay time of 4–5 $\mu$-seconds corresponds to a target at 2 to 2.5 thousand feet and would produce 100% return available at the receiver output. On the other hand a range delay time of 6 $\mu$-seconds corresponds to a target at 3 thousand feet and would produce no return available at the receiver output since the receiver is blanked while echoes returned from a target at a distance of 3 thousand feet are at the receiver input. The range delay time is equal to a full round trip, that is, the transmission time to the target and back and assuming the microwaves are propagated at 1000 feet per $\mu$-second the distance from the target to the receiver in feet may be taken as one half of the range delay time. Thus we see from FIGURE 4 that no return is available at the receiver output when a microwave is reflected from 1.5, 3, 4.5, 6, 7.5, 9 . . . etc. thousand feet and maximum or 100% of the return is available at the receiver output when a microwave is reflected from (.5–1), (2–2.5), (3.5–4), (5–5.5) . . . etc. thousand feet. The invention solves this problem by varying the pulse repetition frequency so that the time scale is effiectively compressed and the range hole effect eliminated by maintaining the target in a visible area at all times. It should be noted that the system is turned "on" from a remote location and the time that the system is turned "on" is critical. If for some reason the system is turned on when the target is, referring to the upper portion of FIGURE 4, at say 24,000 feet, then the return would remain reduced throughout the entire operation. However, if the system is turned on when the target is at 23,000 feet then the maximum return would be realized. All surveillance radar in use today contain this information and no difficulty in turning the system "on" when the target is in an area of maximum return should be encountered since the initial pulse repetition rate, the duty cycle and the range of the target from the missile are known and a simple calculation will give the correct ranges at which maximum return will be found. These calculations may be performed manually but automatic calculation is preferred due to the high approach or closing velocities contemplated.

Thus far we have considered only the case where the target and the radar device, which is mounted on a missile, are approaching each other. There is, however, another important application and that is where the radar device and the target being tracked are receding from each other. Here the invention is also useful since it will extend the range capabilities of any radar tracking system by eliminating the range hole effect.

When the invention is used for tracking a receding target the pulse repetition frequency of oscillator 7 must be reduced in the same manner as it was increased for the other mode of operation in order to eliminate the range hole effect. This is easily accomplished by changing the polarity of the input to integrator 35 and the polarity of the input to servo system 25. When this is done the slope of the voltage applied with respect to time to the control input of oscillator 7 will be the reverse of that applied in the case of an approaching target and the pulse repetition frequency of the oscillator 7 will decrease at a rate corresponding to the velocity at which the tracking device and the target recede from each other. This reduction of the pulse repetition frequency produces an effective expansion of the time scale to maintain a maximum return and eliminates the range hole effect if the target is initially placed in an area of maximum return when the device is actuated. It should also be noted that the initial pulse repetition must be at its maximum value so that the frequency may be reduced to its minimum. This requires an initial adjustment of the circuit parameters to achieve this.

While only one embodiment of the invention has been shown and described in detail for illustration purposes it is to be expressly understood that the invention is not to be limited thereto.

What is claimed is:

1. A radar transmitter system comprising, a microwave generator, an antenna for radiating microwaves, a receiver for receiving and amplifying reflected microwave signals, a duplexer for connecting the generator to the antenna and the antenna to the receiver, pulse modulator means for simultaneously enabling said generator and disabling said receiver, a variable oscillator connected to said means for controlling the frequency at which said means enables said generator and disables said receiver, a command receiver for receiving command signals from a remote location, first means responsive to the signals received by the command receiver for activating the pulse modulator means, second means responsive to the signals received by the command receiver for varying the frequency of the oscillator and third means responsive to the signals received for disconnecting said second means after a minimum time delay whenever the signal to noise ratio of the received signal exceeds a predetermined minimum and connecting the receiver output to the oscillator for varying its frequency.

2. A radar transmitter as set forth in claim 1 in which said second means includes a charged capacitor in series with an adjustable resistor which is adjusted in response to the received signals to provide a voltage across said resistor which changes at a substantially linear rate determined by the value of the resistor.

3. A radar transmitter system comprising, a microwave generator, an antenna for radiating and collecting microwaves, a receiver for amplifying microwave signals, a duplexer for connecting said generator and said receiver to the antenna, means for simultaneously enabling said generator and for disabling said receiver periodically, a linearly variable oscillator connected to said means for linearly controlling the frequency at which said generator and receiver are enabled and disabled, and means responsive to an external signal source for controlling the rate at which the linearly variable oscillator enables and disables the generator and receiver.

4. A radar transmitter system comprising, a microwave generator, an antenna for radiating and collecting microwaves, a first receiver for amplifying microwave signals, a duplexer for connecting the said generator and receiver to the antenna, pulse modulator means for simultaneously enabling the generator and disabling the receiver periodically, a linearly variable oscillator connected to the said means for controlling the frequency at which the generator and receiver are enabled and disabled, a second receiver for receiving at least two signals, first means responsive to the first of said signals for energizing the pulse modulator means and said linearly variable oscillator, and second means responsive to the said second signal for controlling the rate at which the linearly variable oscillator enables and disables the generator and receiver.

5. A radar transmitter as set forth in claim 4 in which said second means includes a charged capacitor in series with an adjustable resistor which is adjusted to correspond to the said second signal from the second receiver to provide a voltage across the said resistor which changes substantially linearly and varies at a rate determined by the value of the said resistor.

6. A radar transmitter system comprising, a microwave generator, an antenna for radiating and collecting microwaves, a receiver for amplifying microwave signals, a duplexer for connecting the generator and the receiver to the antenna, means for simultaneously enabling said generator and disabling said receiver periodically, a linearly variable oscillator connected to said means for controlling the frequency at which said generator and receiver are enabled and disabled, first means responsive to an external signal source and connected to said oscillator for varying the frequency of said oscillator at a rate which is controlled by the signal from said source, and second means responsive to both said signal source and the receiver for disconnecting the said first means from said oscillator and applying the integral of the receiver output to said oscillator.

7. A radar transmitter system comprising a microwave generator, an antenna for radiating and collecting microwaves, a first microwave receiver for amplifying microwave signals, a duplexer for connecting the generator and the receiver to the antenna, pulse modulator means for simultaneously enabling said generator and disabling said receiver periodically, a linearly variable oscillator connected to said means for controlling the frequency at which said generator and said receiver are enabled and disabled, a second receiver for receiving at least two signals, first means responsive to the first of said signals for energizing said pulse modulator means and placing the generator in operation, second means responsive to the second of the said signals for controlling the rate at which the oscillator varies the pulse modulator means, and third means responsive to both the first and second signals from the second receiver and to the first receiver for disconnecting the said second means from the oscillator and for applying the integral of the receiver output to the oscillator for controlling the frequency of oscillation of the said oscillator.

8. A radar transmitter as set forth in claim 7 in which the said second means includes a charged capacitor in series with an adjustable resistor which is adjusted to correspond to the said second signal from the second receiver for providing a voltage across the said adjustable resistor which changes substantially linearly and at a rate determined by the value of the said adjustable resistor.

References Cited in the file of this patent

UNITED STATES PATENTS

| | | |
|---|---|---|
| 2,671,896 | De Rosa | Mar. 9, 1954 |
| 2,869,119 | Fredrick | Jan. 13, 1959 |